Oct. 10, 1939.  W. R. PERRY  2,175,551
REVERSIBLE INCREMENTALLY VARIABLE-SPEED POWER TRANSMISSION MECHANISM
Filed July 22, 1937
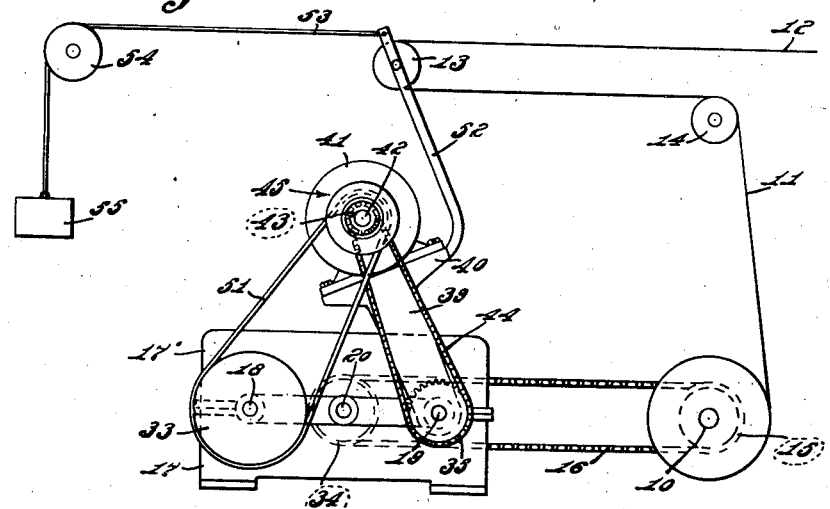
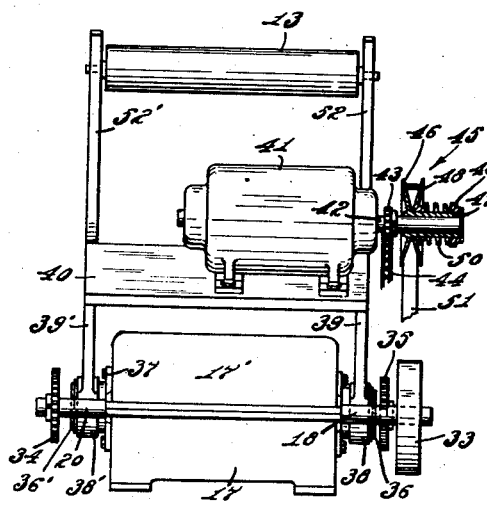
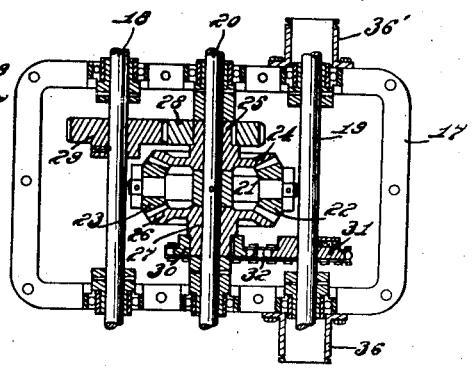
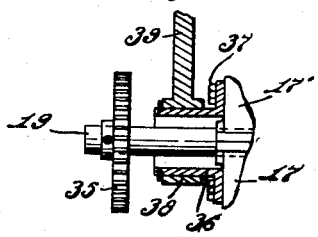
INVENTOR.
William R. Perry,
BY
Hood & Hahn
ATTORNEYS.

Patented Oct. 10, 1939

2,175,551

UNITED STATES PATENT OFFICE 2,175,551

REVERSIBLE INCREMENTALLY VARIABLE-SPEED POWER TRANSMISSION MECHANISM

William R. Perry, Columbus, Ind., assignor to Reeves Pulley Company, Columbus, Ind., a corporation of Indiana Application July 22, 1937, Serial No. 154,971

19 Claims. (Cl. 242—75)

The present application relates to reversible incrementally-variable-speed power transmission mechanism, responsive to variations in resistance to its operating tendency, to vary both the speed and direction of its power output. More particularly, the application pertains to a structure which, as a result of constant speed unidirectional power input, will deliver power at a speed and in a direction dependent upon the resistance offered to its power output.

The primary object of the invention is to produce a mechanism of the character above described which will operate in the manner above outlined. A further object of the invention, however, is to provide a mechanism including an element shiftable, under any suitable external controlling means, to vary the speed and/or direction of power delivery, during constant-speed, unidirectional power input. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a side elevation, somewhat diagrammatic, of an embodiment of my invention;

Fig. 2 is an end elevation thereof taken from the left-hand end of Fig. 1;

Fig. 3 is an enlarged plan of differential mechanism forming an element of the invention, the casing cover having been removed and parts being shown in section for clarity of illustration; and Fig. 4 is an enlarged sectional fragmentary view of a detail, looking from the right-hand end of Fig. 3.

While the present invention is not, by any means, limited to strand handling or strand winding applications, I have illustrated the invention in connection with a strand winding organization. In Fig. 1, I have shown a strand handling roll 10 adapted to wind or unwind a strand 11, which, at 12, is to be understood as being delivered from or taken to a strand handling machine of some sort (not shown). The strand 11 is formed to provide a bight in which is received a roll 13, and passes over a roll 14 between said bight and the roll 10 (although the interposition of the roll 14 is not essential). The roll 10 is provided with a sprocket 15 over which passes a chain 16 which is driven in the manner hereinafter to be described.

A casing 17 provided with a cover 17' provides journal mountings for three parallel coplanar shafts 18, 19, and 20, the shafts 18 and 19 being respectively positioned adjacent the opposite ends of the casing and the shaft 20 being positioned between the shafts 18 and 19. Pinned to the shaft 20 within the casing 17 is a pinion carrier 21 which projects diametrically oppositely from said shaft and carries on its respective projections bevelled pinions 22 and 23. A bevelled ring gear 24 having a hub 25 is loosely mounted on the shaft 20 and meshes with both of said pinions 22 and 23. A second bevelled ring gear 26 having a hub 27 is loosely mounted on the shaft 20 and meshes with both of said pinions 22 and 23. It will be seen that the shaft 20 carries a differential mechanism of substantially standard construction comprising the carrier 21, pinions 22 and 23, and ring gears 24 and 26.

To accomplish the objects of the present invention, however, it is essential that the bevelled gears 24 and 26 shall have operative projections from the casing 17 which projections shall be non-coaxial. Therefore a spur gear 28 is fixed to the hub 25 of gear 24 and meshes with a spur gear 29 fixed on the shaft 18; while a sprocket 30 is mounted on the hub 27 of the gear 26 and is connected, by a chain 32 with a sprocket 31 fixed to the shaft 19.

Outside the casing, the shaft 18 carries a pulley 33; the shaft 20 carries a sprocket 34; and the shaft 19 carries a sprocket 35.

The chain 16 passes over the sprocket 34 on the shaft 20 to provide a driving connection between said shaft 20 and the roll 10.

In order to accomplish the objects of the present invention, it is desirable to mount a power delivery shaft for oscillation upon an arc coaxial with the shaft 19. Annular flanges 36 and 36', coaxial with said shaft 19, are suitably provided. If desired, these flanges may be part annular instead of as shown, and the flanges may be formed integrally with the casing or they may be separate elements suitably secured to the casing through the medium of bolts 37, as shown. If desired, anti-friction bearings carried upon the shaft 19 may be substituted for the flanges 36 and 36'.

The flanges 36 and 36' comprise trunnions upon which are oscillably mounted hubs 38 and 38' of legs 39 and 39' which support a motor base 40 for oscillation in an arc coaxial with the shaft 19. A motor 41 having a spindle 42 is mounted upon said base 40. A sprocket 43 is fixed to the spindle 42 and is connected, by a chain 44, to drive the sprocket 35 on the shaft 19.

A resiliently expansible V-pulley, indicated generally at 45, is mounted also upon the spindle 42, said pulley comprising a coned disc 46 having an elongated hub 47 projecting from its coned face and fixed to the spindle 42. A mating coned disc 48 is slidably mounted, in facing relation to the disc 46, upon the hub 47. A stop collar 49 secured to the hub 47 provides an abutment for one end of a spring 50, the opposite end of which bears against the disc 48 to urge said disc constantly toward the disc 46. An edge active belt 51 is received between the discs 46 and 48, and the inner flat surface of said belt lies about the flat faced pulley 33 on the shaft 18.

Obviously, the belt 51 provides a driving connection between the expansible pulley 45 and the flat faced pulley 33; and, as obviously, if the center-distance between the pulleys 45 and 33 is increased, the belt 51 will be crowded more deeply into the groove between the discs 46 and 48, forcing the disc 48 to move away from the disc 46, whereby the speed of the pulley 33 will be decreased, although the speed of the pulley 45 remains constant.

It will be seen that the pulleys 45 and 33 constitute cooperating power transmitting elements mounted respectively upon the spindle 42 and the shaft 18, and that one of said cooperating power transmitting elements is adjustable to vary the ratio between the respective effective diameters of said power transmitting elements.

Inspection of Fig. 1 will clearly demonstrate the fact that, if the motor base 40 is moved in a clockwise direction, the center-distance between the spindle 42 and the shaft 18 will be increased, whereby the effective diameter of the pulley 45 will be decreased; while the center-distance between the spindle 42 and the shaft 19 will not be affected. Likewise, if the motor base is moved in a counterclockwise direction, the center-distance between the spindle 42 and the shaft 18 will be decreased, whereby the effective diameter of the pulley 45 will be increased; although the center-distance between the spindle 42 and the shaft 19 will not be affected.

Assuming that the motor 41 drives its spindle 42 in a counterclockwise direction as viewed in Fig. 1, and assuming that the motor base 40 is so positioned that the shaft 18 will be driven at a speed identical with that of the shaft 19, it will be seen that the ring gear 26 will be driven in a counterclockwise direction, while the ring gear 24 will be driven in a clockwise direction at an identical speed, so that the carrier 21 and the shaft 20 to which it is fixed will remain stationary. If, now, it be assumed that the machine (not shown) with which the portion 12 of the strand 11 is associated begins to deliver the strand, the bight in the strand will be elongated to permit the roller 13 to move toward the left under the influence of the weight 55 which is connected to the motor base 40 through a cable 53 passing over a roller 54 and secured to arms 52 and 52′ between which the roller 13 is journalled. Such movement of the roller 13 will cause counterclockwise movement of the motor base about its journalled axis to decrease the center-distance between the spindle 42 and the shaft 18 to increase the effective diameter of the pulley 45, whereby the counterclockwise speed of the shaft 18 will be increased. This will result in an increase in the clockwise speed of the ring gear 24 and, since the ring gear 26 continues to be driven at its previous counterclockwise speed, the carrier 21 will begin to rotate in a clockwise direction. As the carrier 21 and its shaft 20 rotate in a clockwise direction, the chain 16 will drive the roll 10 in a clockwise direction to begin to wind the strand 11. If the speed of delivery of the strand 12 is increased, the bight within which the roller 13 is received will again be elongated to permit still further increase in the effective diameter of the pulley 45, whereby the speed of the shaft 20, and consequently the speed of the roll 10 will be correspondingly increased. If, now, the speed of delivery of the strand is decreased, or if it is stopped altogether, the roll 10 will continue to wind to shorten the bight 13, and as the bight 13 is shortened, the speed of clockwise rotation of the carrier 21 will be gradually decreased until finally it will come to a stop.

If the machine associated with the portion 12 of the strand 11 is now reversed (or if it be assumed that the machine is one which consumes, instead of delivering, the strand material) it will be seen that operation of the machine (not shown) will shorten the bight 13, whereby the center-distance between the spindle 42 and the shaft 18 will be increased to decrease the effective diameter of the pulley 45 to decrease the counterclockwise speed of the shaft 18, whereby the speed of clockwise rotation of gear 24 is decreased. Since the gear 26 is still rotating at a constant speed in a counterclockwise direction, such a decrease in the clockwise speed of the gear 24 will result in counterclockwise rotation of the carrier 21 and shaft 20, so that the roll 10 will be driven to unwind the strand; and the speed at which the roll 10 is so driven will depend upon the shortness of the bight in which is received the roller 13.

Thus, it will be seen that the speed of operation of the output shaft 20 of the present organization is incrementally variable, dependent upon the center-distance of the spindle 42 and the shaft 18, from a maximum speed in one direction through a zero speed to a maximum speed in the opposite direction. That variation may be effected in any desired manner by applying any suitable external force to move the motor base 40 about its journalled axis. In the embodiment illustrated in Fig. 1, that external force is the tension existing in the bight portion of the strand 11. It may be conceived that a man might stand and hold the end 12 of the strand. So long as he stands still and holds that portion of the strand against movement, the roll 10 will not be driven, though the motor 42 is in constant operation at constant speed. If, now, he walks toward the roller 13, the roll 10 will be operated to wind the strand at a speed dependent entirely upon the speed at which our supposititious man walks. When he stops, the roll 10 will stop; and, if he then starts to walk away from the roller 13, the roll 10 will be driven in an opposite direction to unwind the strand at the speed selected by the experimenter.

In the illustrated organization, any other well known means may be used to bias the motor base toward movement in such a direction as to shorten the center-distance between the spindle 42 and the shaft 18. A spring might be used, or the organization might be mounted in such a position that the weight of the motor base and motor would constitute the bias. The use of a counterweight is deemed, however, to be preferable because it exerts a constant bias, whereas either a spring or the effective weight of the motor and motor base itself would vary with the position of the motor base.

Obviously, the combination of differential mechanism and means for driving one input shaft thereof at constant speed while driving the other input shaft thereof at variable speed as a result of movement of the driving shaft to vary the speed of the variably driven differential shaft, constitutes a phase of my invention which may be used in numerous organizations other than the particular application here illustrated; and, except as the language of the claims appended hereto may constitute limitations, I do not intend to limit the scope of my invention to the single application illustrated. For instance, the device of the present application might be connected to drive a pump at variable speeds, the position of the motor bed 40 being under the control either of a float in a reservoir to which the pump delivers liquid, or of static-pressure-responsive mechanism operatively associated with the pump outlet.

It will be equally obvious that it is not essential that the shaft 20 be used as the output shaft of the organization. That is, if any two shafts of the differential are driven by the motor 41 at different speeds, the third shaft will be rotated; and the speed and direction of such rotation will depend upon the speed ratio between the driven input shafts. Likewise, it will be clear that the particular differential mechanism illustrated is not an essential of the present invention; but that the sole requirement is that the two input shafts must be non-coaxial, so that the motor may be moved about the axis of one input shaft to vary the distance between the motor and the other input shaft.

I claim as my invention:

1. In a device of the class described, differential mechanism comprising two relatively rotatable coaxial end elements and a planetary element connecting said end elements and revolvable about the common axis thereof, means for driving two of said elements including a driving shaft oscillable about an external axis and drivingly connected to both of said two elements, means connecting the third of said elements to drive a machine, and means responsive to variations in a condition at said machine for moving said driving shaft to vary the speed of one of said driven elements.

2. In a device of the class described, differential mechanism comprising two relatively rotatable coaxial end elements and a planetary element connecting said end elements and revolvable about the common axis thereof, means operatively connected to one of said elements for rotation on an axis spaced from the common axis of said end elements, means for driving said last-named means and another of said elements including a driving shaft oscillable about an external axis eccentric with respect to said spaced axis and drivingly connected to both of said two elements, means connecting the third of said elements to drive a machine, and means responsive to variations in a condition at said machine for moving said shaft to vary the speed of one of said driven elements.

3. In a device of the class described, differential mechanism comprising two relatively rotatable coaxial end elements and a planetary element connecting said end elements and revolvable about the common axis thereof, a source of power, a shaft driven thereby, means carried by said shaft and directly connected to drive two of said elements, the connecting means for each one of said two elements being independent of the other one of said two elements and means for varying the speed at which said common means drives one of said two elements without varying the speed of the other of said two elements.

4. In a device of the class described, differential mechanism comprising two relatively rotatable coaxial end elements and a planetary element connecting said end elements and revolvable about the common axis thereof, driving means, means including an expansible pulley providing a driving connection between said driving means and one of said elements, means providing a driving connection between said driving means and another of said elements, and means for varying the effective diameter of said expansible pulley to vary the speed at which the element driven thereby is rotated.

5. In a device of the class described, differential mechanism comprising two relatively rotatable coaxial end elements and a planetary element connecting said end elements and revolvable about the common axis thereof, a first shaft drivingly connected with one of said elements, a second shaft drivingly connected with another of said elements, the axes of said shafts being spaced from each other, driving means mounted for oscillation about the axis of said second shaft, means connecting said driving means to drive said second shaft, and means including an expansible pulley connecting said driving means to drive said first shaft.

6. In a device of the class described, differential mechanism comprising two relatively rotatable coaxial end elements and a planetary element connecting said end elements and revolvable about the common axis thereof, a first shaft drivingly connected with one of said elements, a second shaft drivingly connected with another of said elements, the axes of said shafts being spaced from each other, driving means mounted for oscillation about the axis of said second shaft, said driving means including a driving shaft, a pulley on said driving shaft, a pulley on said first shaft, one of said pulleys being resiliently expansible, an endless flexible relatively inelastic member providing a driving connection between said pulleys, and means connecting said driving shaft to drive said second shaft.

7. In a device of the class described, differential mechanism comprising a carrier, pinions carried by said carrier, a first ring gear meshing with said pinions, and a second ring gear meshing with said pinions, a common source of power, means connecting said power source to drive one of said ring gears, means independent of said last-named means connecting said power source to drive the other of said ring gears, varying the speed at which said common power source drives one of said ring gears without varying the speed of the other of said ring gears.

8. In a device of the class described, differential mechanism comprising a carrier, pinions carried by said carrier, a first ring gear meshing with said pinions, and a second ring gear meshing with said pinions, a first shaft drivingly connected with said first ring gear, a second shaft drivingly connected with said second ring gear, the axes of said shafts being spaced from each other, driving means mounted for movement about the axis of said second shaft, means including a resiliently expansible pulley connecting said driving means to drive said first shaft, and means connecting said driving means to drive said second shaft.

9. In a device of the class described, a strand-handling roll, and means for driving said roll comprising differential mechanism including two relatively rotatable coaxial end elements and a planetary element connecting said end elements and revolvable about the common axis thereof, a first shaft drivingly connected with one of said elements, a second shaft drivingly connected with another of said elements, and a third shaft drivingly connected with the third of said elements, means connecting said third shaft to drive said roll, a driving shaft, means including an expansible pulley providing a driving connection between said driving shaft and said first shaft, means providing a driving connection between said driving shaft and said second shaft, and means operable to vary the effective diameter of said expansible pulley.

10. In a device of the class described, a strand-handling roll, means for feeding a strand of material toward said roll, and means for driving said roll at varying speeds dependent upon the tension upon the strand, comprising a first shaft, a second shaft, a third shaft, differential mechanism comprising two relatively rotatable coaxial end elements and a planetary element connecting said end elements and revolvable about the common axis thereof, means providing a driving connection between said first shaft and one of said elements, means providing a driving connection between said second shaft and another of said elements, means providing a driving connection between said third shaft and the third of said elements, a motor having a spindle, means supporting said motor for movement on an arc concentric with said second shaft, means connecting said motor to drive said second shaft, a pulley on said motor spindle, a pulley on said first shaft, one of said pulleys being a resiliently-expansible V-pulley, a belt providing a driving connection between said pulleys, means resiliently urging said supporting means toward movement in one direction, and a roll carried by said supporting means and received in a bight of said strand, whereby shortening of said bight will move said supporting means against the tendency of the last-named means.

11. In a device of the class described, a strand-handling roll, means for feeding a strand of material toward said roll, and means for driving said roll at varying speeds dependent upon the tension upon the strand, comprising a first shaft, a second shaft, a third shaft, differential mechanism comprising two relatively rotatable coaxial end elements and a planetary element connecting said elements and revolvable about the common axis thereof, means providing a driving connection between said first shaft and one of said elements, means providing a driving connection between said second shaft and another of said elements, means providing a driving connection between said third shaft and the third of said elements, a motor having a spindle, means supporting said motor for movement on an arc concentric with said second shaft, said last-named means being biased toward movement in one direction upon said arc, means connecting said motor to drive said second shaft, a pulley on said motor spindle, a pulley on said first shaft, one of said pulleys being a resiliently-expansible V-pulley, a belt providing a driving connection between said pulleys, and a roll carried by said supporting means and received in a bight of said strand, whereby shortening of said bight will move said supporting means against its bias.

12. In a device of the class described, a strand-handling roll, means for feeding a strand of material toward said roll, and means for driving said roll at varying speeds dependent upon the tension upon the strand, comprising a first shaft, a second shaft, a third shaft, differential mechanism comprising two relatively rotatable coaxial end elements and a planetary element connecting said end elements and revolvable about the common axis thereof, means providing a driving connection between said first shaft and one of said elements, means providing a driving connection between said second shaft and another of said elements, means providing a driving connection between said third shaft and the third of said elements, a motor having a spindle, means supporting said motor for movement on an arc concentric with said second shaft, means connecting said motor to drive said second shaft, a pulley on said motor spindle, a pulley on said first shaft, one of said pulleys being a resiliently-expansible V-pulley, a belt providing a driving connection between said pulleys, means resiliently urging said supporting means toward movement in a direction to shorten the center-distance between said pulleys, and a roll carried by said supporting means and received in a bight of said strand, whereby shortening of said bight will move said supporting means in a direction to increase the center-distance between said pulleys.

13. In a device of the class described, a strand-handling roll, means for feeding a strand of material toward said roll, and means for driving said roll at varying speeds dependent upon the tension upon the strand, comprising a first shaft, a second shaft, a third shaft, differential mechanism comprising two relatively rotatable coaxial end elements and a planetary element connecting said end elements and revolvable about the common axis thereof, means providing a driving connection between said first shaft and one of said elements, means providing a driving connection between said second shaft and another of said elements, means providing a driving connection between said third shaft and the third of said elements, a motor having a spindle, means supporting said motor for movement on an arc concentric with said second shaft, means connecting said motor to drive said second shaft, a pulley on said motor spindle, a pulley on said first shaft, one of said pulleys being a resiliently-expansible V-pulley, a belt providing a driving connection between said pulleys, said supporting means being biased toward movement in a direction to shorten the center-distance between said pulleys, and a roll carried by said supporting means and received in a bight of said strand, whereby shortening of said bight will move said supporting means in a direction to increase the center-distance between said pulleys.

14. Power transmission mechanism comprising a first power-input shaft, a second power-input shaft, a power-output shaft, a driving shaft mounted for oscillation about the axis of said first power input shaft, means connecting said driving shaft to drive said first input shaft, means including an expansible V-pulley connecting said driving shaft to drive said second input shaft, differential mechanism comprising two relatively rotatable coaxial elements respectively drivingly associated with two of said shafts and a planetary element connecting said coaxial elements, revolvable about the common axis thereof, and drivingly associated with the third of said shafts, and means for moving said driving shaft about the axis of said first input shaft.

15. Power transmission mechanism comprising a first power-input shaft, a second power-input shaft, a power output shaft, a driving shaft mounted for oscillation about the axis of said first input shaft, means connecting said driving shaft to drive said first input shaft, means including an expansible V-pulley connecting said driving shaft to drive said second input shaft, a carrier fixed to said output shaft, pinions mounted on said carrier at points diametrically opposite from the axis of said output shaft, a bevelled gear loosely mounted on said output shaft meshing with said pinions and drivingly connected to one of said input shafts, a second bevelled gear loosely mounted on said output shaft meshing with said pinions and drivingly connected to the other of said input shafts, and means for moving said driving shaft about the axis of said first input shaft.

16. Reversible-variable-speed power transmission mechanism comprising a differential mechanism including a pinion carrier, pinions on said carrier, two ring gears each meshing with said pinions, and shafts respectively operatively associated with said carrier and said ring gears, two of said shafts being positioned on spaced axes, respectively, a driving shaft, a pulley mounted on said driving shaft, a pulley mounted on one of said spaced shafts, one of said pulleys being a resiliently expansible V-pulley, a belt providing a driving connection between said pulleys, a sprocket on said driving shaft, a sprocket on the other of said spaced shafts, a chain connecting said sprockets, and means supporting said driving shaft for bodily rocking movement in an arc coaxial with said other of said spaced shafts, whereby the center-distance between said pulleys may be varied to vary the speed of said one shaft incrementally from a value less than the speed of the other of said spaced shafts to a value greater than the speed of said other of said spaced shafts.

17. In a device of the class described, a casing, differential mechanism within said casing comprising two relatively rotatable coaxial end elements and a planetary element connecting said end elements and revolvable about the common axis thereof, a first shaft journalled in said casing, a second shaft journalled in said casing, a third shaft journalled in said casing parallel with said first and second shafts, gearing connecting one of said elements to said first shaft, gearing connecting another of said elements to said second shaft, means drivingly connecting the third of said elements to said third shaft, a motor base mounted on said casing for rocking movement about the axis of said second shaft, a motor mounted on said base and having a spindle, a sprocket on said spindle, a sprocket on said second shaft, a chain providing a driving connection between said two sprockets, cooperating power-transmitting elements on said spindle and on said first shaft, one of said power-transmitting elements being of controllably-variable effective diameter, and means operable to vary the effective diameter of said one element.

18. In a device of the class described, a casing, differential mechanism within said casing comprising a carrier, pinions mounted on said carrier, a ring gear meshing with said pinions, a second ring gear meshing with said pinions, a first shaft journalled in said casing, a second shaft journalled in said casing, a third shaft journalled in said casing parallel with said first and second shafts and positioned therebetween, said third shaft constituting an axis of rotation for said carrier and for said ring gears, said carrier being fixed thereto, a spur gear fixed to said first ring gear, a spur gear fixed to said first shaft and meshing with said first-mentioned spur gear, a sprocket fixed to said second ring gear, a sprocket fixed to said second shaft, a chain providing a driving connection between said sprockets, a motor base mounted on said casing for rocking movement about the axis of said second shaft, a motor mounted on said base and having a spindle, a sprocket on said spindle, a sprocket on said second shaft, a chain providing a driving connection between said two last-mentioned sprockets, cooperating power-transmitting elements on said spindle and on said first shaft, one of said power-transmitting elements being of controllably-variable effective diameter, and means operable to vary the effective diameter of said one element.

19. In a device of the class described, a casing, three parallel coplanar shafts journalled therein, differential mechanism in said casing and comprising two relatively rotatable coaxial end elements and a planetary element connecting said end elements and revolvable about the common axis thereof, means providing a driving connection between one of said shafts and one of said elements, means providing a driving connection between another of said shafts and another of said elements, means providing a driving connection between the third shaft and the third of said elements, a motor base mounted on said casing for rocking movement about the axis of said second-mentioned shaft, a motor mounted on said base and having a spindle, means providing a constant driving connection between said spindle and said second-mentioned shaft, cooperating power-transmitting elements mounted on said spindle and on said first-mentioned shaft to provide a driving connection therebetween, and means for controllably varying the ratio between the respective effective diameters of said power-transmitting elements.

WILLIAM R. PERRY.